March 18, 1930.  I. S. HOCKER  1,751,331
PROCESS OF EXTRACTION OF OILS FROM VEGETABLE MATTER
Filed March 10, 1926
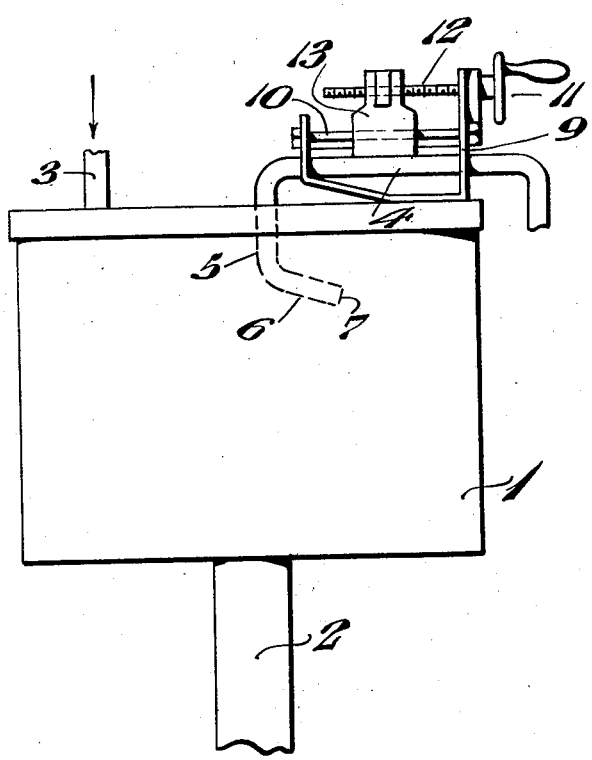
INVENTOR.
Ivan S. Hocker,
BY
ATTORNEYS.

Patented Mar. 18, 1930

1,751,331

UNITED STATES PATENT OFFICE

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE

PROCESS OF EXTRACTION OF OILS FROM VEGETABLE MATTER

Application filed March 10, 1926. Serial No. 93,787.

The invention relates to the extraction and separation of valuable contents of vegetable materials, such as the fixed oils of seeds, beans, nuts and other fruit. Some of the important oils which may be separated and obtained by the process, are commonly in more or less solid form at ordinary temperatures, and often referred to as fats or butters. In some instances, the process may be used to obtain not only the oil content, but also other contents of value not heretofore commercially available.

The objects of the invention are to provide a process adapted by its superiority to take the place of the processes heretofore used in extracting oils from such materials; to make the extraction, separation and recovery more complete than can be accomplished by some processes (as, for instance, the expression processes commonly used) and the quality of the product better than that resulting from other processes (as processes involving chemical dissolution of the oil); in some instances to separate and recover substances not heretofore commercially available; and to reduce the cost of obtaining such products.

The oils are developed in many plants in exceedingly intimate association with other substances formed in the cells, particularly those connected with the plant-food and the like. These substances are chemically diverse and intricate, but since those most difficult to separate from the oil contain starch and all are separated by means which separate starch, they are here illustrated by starch. In the processes generally used, separation of the oil is effected by expression of the oil or by dissolution of the oil in chemical solution, accompanied sometimes by treatment incidental thereto. In lieu of such processes, the present invention contemplates effecting separation by applying treatment to convert the material into mixed solids and liquids of different specific gravities, and then separating the liquid or liquids sought from the solids and other liquid by proper application of centrifugal force. The means and methods of converting the material into a mixture of solids and suitable liquids, may comprise such instrumentalities as mechanical subdivision, temperature effects, hydrolyzing and chemical conversion of insoluble substances to substances which go into solution, or such of them as may be required by the nature of the particular material and the substances therein presented for dissociation and separation. The invention contemplates the use of such means and methods as may be needed to change the material into a separable mixture of solids with liquid or liquids of different specific gravities and the consequent separation by centrifuging, as distinguished from processes depending on expression or chemical dissolution of the oil heretofore used. The figure illustrates diagrammatically one form of apparatus employed in carrying out my novel process.

For purposes of detailed exposition, the application of the process to the extraction and separation of the oil and other valuable content of the cocoa bean is here fully set forth. The oil content of the cocoa bean (often called cocoa fat or cocoa butter) is so intimately associated with extremely minute particles of starchy character that the difficulty of complete separation is fully presented; and, accordingly, the treatment of the cocoa bean serves to illustrate fully the characteristics of the process. But it will be understood that the process is applicable, with appropriate variations in details, to other fruit containing such contents as oil and when applied to some of them, the process may be satisfactorily worked without using all the steps and precautions which are preferably used in the treatment of the cocoa bean.

The cocoa bean, like many other seeds of plants, comprises fibrous cells containing within them oil, albuminous substances, starchy substances and water, besides other substances. The oil constitutes about 50 per cent, the starch about 10 per cent, and the albumen about 15 per cent, of the shelled cocoa beans. To obtain from them the desired contents, they should preferably be treated as follows:—

*Roasting.*—In applying the process, it is preferable to begin by roasting the bean for, say, about half an hour, to heat it all the way through. In the case of the cocoa bean this roasting serves partly to rupture the starch and coagulate to a considerable degree the albuminous substances. Heretofore cocoa beans have been roasted to develop the flavor and the amount of heat thus applied is usually sufficient to prepare the bean for satisfactory operation of the present process. In practicing the process, it is generally preferable to be sure that the material has been sufficiently heated.

*Reducing to a state of minute division.*— The cocoa bean is cracked to about the size of a small pea and put through a fanning operation to remove the shells. The material is then put through a fine-grinding mill or other means of reducing it to mechanically finely-divided form. In the case of the cocoa bean, the product emerging from the fine-grinding mill is in melted condition and substantially similar to the "chocolate liquor" of commerce. The preparation of the cocoa bean is, accordingly, substantially the same as that commonly used as preliminary to expression processes by which the oil of that bean is commonly extracted; and the present invention can be applied to the extraction and separation of such oil by buying "chocolate liquor" in the market.

*Making suitable solution of certain contents.*—In the case of the cocoa bean and other oil bearing seeds, the difficult dissociation of the starch content from the oil content can be best completely effected by providing for hydrolyzing and saccharifying to bring the starch content to suitable liquid form. Taking the chocolate liquor prepared as recommended, water is added and thoroughly incorporated with the material, so as to bring about as nearly as may be a homogeneous mass wherein all the minute particles of starch are in contact with water. The preferable details of accomplishing this, in the case of the cocoa bean, are as follows: The water is added to the "chocolate liquor" before it hardens, or the cakes of hardened liquor are melted and the water added, or the water is added and the whole slowly warmed. The temperature of the water should be above 93° F., the melting point of the oil, and below the point at which the material tends to lump. Water at about 120 degrees Fahrenheit to 130 degrees Fahrenheit, with proper slow stirring, results in a smooth mixture. About 40 quarts of water to 100 pounds of chocolate liquor is first added. With sufficient stirring at the indicated temperature the result is to agglomerate some of the oil and make a smooth paste. The temperature is then preferably raised slowly almost to the boiling point, so that some of the starch which has not gone into solution, is hydrolyzed. In the case of the cocoa bean, at this stage some additional particles of the starch go into solution, but other particles apparently swell without dissolving, and the material is accordingly then subjected to a saccharifying process, preferably as follows: About the same quantity, 40 quarts of cool or lukewarm water, is added to 100 pounds of hydrolyzed material and with it about 5 pounds of sugar to facilitate the separation of the free fat or oil by the increase of the specific gravity of the liquid containing the starch converted to solubilized form. By the addition of the water, or otherwise, the temperature is lowered to a point (about 150° Fahrenheit), whereat the action of the enzyme to be employed is not inhibited. An enzyme or agent capable of converting the undissolved starch to a substance soluble in the water, as, for instance, diastasic malt extract, is added and stirred into the mass, with the result that the undissolved starch is saccharified and brought into solution. After it has been stirred in, it is desirable to raise the temperature to about 150° Fahrenheit and keep it there for five or ten minutes.

*Separating the dissociated contents.*—The material treated as aforesaid appears as a thin, watery mass. Preferably more water (say, about 40 quarts to 100 pounds of material, at a temperature of 150° Fahrenheit or higher) is added and the whole is heated up to say 170° Fahrenheit to 180° Fahrenheit, so that the constituents of the mass, and particularly the oil, will be in suitable condition for the separating operation.

By the foregoing treatment the oil content is dissociated effectively from the starch content and other substances, in the form of liquids of specific gravities different from each other and different from the specific gravities of the other substances in the mixture. In the case of the cocoa bean the material has become a mixture of oil, water containing sugar and water-soluble chocolate extracts in solution, water-insoluble chocolate extracts and other solids.

Some separation may be effected by gravity, but for satisfactory results the separation is made substantially complete by proceeding with the process as follows:—

Maintaining the temperature of the mixture so that the oil is in liquid form, the mixture is introduced into a separating apparatus operating centrifugally. The apparatus is preferably a solid basket centrifuge specifically devised for this particular operation by providing a nozzle such as is illustrated in the accompanying drawing having a sharp, preferably straight, edge portion which gives a clean-cut, rapid separation, adapted to be inserted to slight depth in the liquid in the basket or bowl of a centrifuge such as is diagrammatically shown and at a radial angle of about forty-five degrees, which with such a nozzle avoids agitation interfering with effective separation.

The separation may be effected by moving the nozzle radially to withdraw the constituents of the mixture separately according to their specific gravities. But it has been found more convenient in practice to keep adding to the mass in the basket, leaving the nozzle substantially unmoved, so that the liberated component parts built radially inward to the nozzle which is thus supplied with relatively large quantities of the different products according to their specific gravities. In the annexed drawings I have shown diagrammatically one form of apparatus for carrying out the above described steps of my novel process, wherein the figure illustrates a solid basket centrifuge employed for separating the different liquids produced by the various steps of my novel process, and provided with an adjustable or movable discharge nozzle for removing or withdrawing said separated liquids.

In the drawings 1 designates a centrifuge rotated by the shaft 2, and into which the mixed liquids may be introduced through the inlet pipe 3 or the like from the mixing tank not shown. 4 designates a nozzle the intake end 5 of which is positioned in the center of the centrifuge 1 and provided with the bent portion 6, which terminates in the sharp well defined edge 7 which gives a clearer separation than a nozzle the intake edge of which is rounded. The nozzle 4 is mounted on a bracket 9 and guide rod 10, and is movable towards or away form the center of the centrifuge 1 by manipulating the hand wheel 11 which turns the threaded stem 12 which engages the nut 13 carried by the nozzle, it being understood that any other suitable means for moving or shifting the position of said nozzle may be employed.

In the case of the cocoa bean the products are thus separated and recovered as follows:—

First. The oil, which is cocoa fat or cocoa butter in exceptionally pure condition.

Second. A small quantity of something like an emulsion of the oil and watery extract of water-soluble chocolate solids with some dissolved sugar. The mixture is preferably further treated to separate its constituents. This may be accomplished chemically by the introduction of suitable salt (such as sodium chloride) which coagulates the fat by ionization or mechanically by the use of centrifugal apparatus or preferably by a combination of the chemical and mechanical means. The oil thus obtained may be added to that first drawn off. Tests have shown that the total amount of oil thus obtained is a considerable percentage more than that obtained by the processes commonly used and approaches closely the theoretical. The watery extract of soluble chocolate solids may be added to the liquor next obtained from the centrifugal.

Third. The watery extract of soluble chocolate solids is believed to be the first chocolate extract which is both free from oil and soluble; and as such it is a new product of much value. It has a strong chocolate flavor and may be readily concentrated in vacuoles to a syrup and prepared as a beverage. It will be understood that when the process is applied to some other oil bearing seeds the place of this extract of soluble chocolate solids will be taken by more or less of other substances in the water.

Fourth. The remaining sludge contains a little liquor, probably a very small percentage of something like oil and some insoluble chocolate solids. When treated, for instance in an open kettle with a suction fan to draw off the water, it is reduced to a dark, practically oil-free paste or powder.

In elaborating the preferred details applicable to extracting and separating contents of the cocoa bean, it is not intended to suggest that all such details are essential to the satisfactory practice of the process to extract the contents of other fruit. The invention contemplates modifications to adapt it to the particular application. In instances where the oil content is associated with starch in a manner comparable to the association in the case of the cocoa bean, the details of the application of the process are substantially the same. Thus the process has been successfully applied to the extraction and separation of peanut oil as follows: The peanuts are shelled, roasted until the skin comes off, and finely ground into a pasty mass. Water is added, the temperature raised and then lowered after which the enzyme and sugar are added to saccharify and solubilize the starch content. The temperature is then raised and additional water added, until there is obtained a mixture containing the oil, the watery solution of distinctly different specific gravity, and the solids, which are then separated by causing the mixture to revolve and the constituents to separate radially according to their different specific gravities and withdrawing them—all substantially as in the case of the cocoa bean. In the case of some other materials (as, for instance, cocoanut) where the oil is not so intimately associated with starch, the separable mixture of oil in liquid form, watery solution and solids, may be obtained and separated according to the process without the steps or precautions directed towards solubilizing the starch.

The following claims are made:—

1. A process of separating oil bearing vegetable material into its solid, water-soluble and oily constituents, comprising roasting and finely dividing the material, thoroughly mixing water therewith at a temperature above the melting point of said oily constituent, subjecting the mixture to a temperature approaching the boiling point, cooling said mixture and adding saccharifying enzyme and sugar to said mixture, heating and rotating said mixture, to cause the different liquids to separate radially, and withdrawing the different liquids thus separated.

2. A process of separating fat bearing vegetable material into its solid, water-soluble and fatty constituents comprising thoroughly mixing water with the roasted and finely divided material at a temperature above the melting point of said fatty constituent, subjecting the mixture to a temperature approaching the boiling point, cooling said mixture, adding a saccharifying enzyme and sugar to said mixture, rotating the mixture at a temperature whereat said fatty constituent is in liquid form, to cause the different liquids to separate radially, and withdrawing the different liquids thus separated.

3. The process of extracting oil from oil-bearing vegetable material, comprising roasting and finely grinding said material, adding water thereto to dissolve any water-soluble constituents of said material, heating and adding a saccharifying enzyme to solubilize any starchy constituents of said mixture, rotating said mixture at a temperature above the melting point of the oil content of said mixture to cause the liquids to separate radially and lastly withdrawing the liquids separated.

4. The process of separating oil and starch from oil and starch bearing vegetable material, which consists in roasting and finely grinding said material, adding water thereto to disolve the water-soluble constituents of said material, adding a saccharifying enzyme to solubilize any starchy contents of said material, heating said mixture to melt any oil contents thereof, rotating said mixture to cause the liquids thus formed to separate radially and lastly withdrawing the liquids thus separated.

IVAN S. HOCKER.